(12) United States Patent
Tsunoda et al.

(10) Patent No.: US 12,545,802 B2
(45) Date of Patent: Feb. 10, 2026

(54) METHOD FOR FORMING MULTILAYER COATING FILM

(71) Applicants: BASF COATINGS GMBH, Münster (DE); NISSAN MOTOR CO. LTD, Yokohama (JP)

(72) Inventors: Takeshi Tsunoda, Kanagawa (JP); Tomoyuki Okamoto, Yokohama (JP); Satoshi Watanabe, Yokohama (JP); Naoki Kuriyama, Yokohama (JP); Kouta Futamata, Yokohama (JP); Takeshi Gotou, Yokohama (JP); Chie Michiura, Yokohama (JP)

(73) Assignees: BASF COATINGS GMBH, Muenster (DE); NISSAN MOTOR CO. LTD., Kanagawa (JP)

( * ) Notice: Subject to any disclaimer, the term of this patent is extended or adjusted under 35 U.S.C. 154(b) by 347 days.

(21) Appl. No.: 18/252,071

(22) PCT Filed: Oct. 13, 2021

(86) PCT No.: PCT/EP2021/078286
§ 371 (c)(1),
(2) Date: May 8, 2023

(87) PCT Pub. No.: WO2022/100948
PCT Pub. Date: May 19, 2022

(65) Prior Publication Data
US 2023/0392036 A1 Dec. 7, 2023

(30) Foreign Application Priority Data
Nov. 13, 2020 (JP) .................. 2020-189187

(51) Int. Cl.
*B05D 7/14* (2006.01)
*B05D 7/00* (2006.01)
*C09D 7/65* (2018.01)
*C09D 133/08* (2006.01)
*C09D 175/14* (2006.01)

(52) U.S. Cl.
CPC ............. *C09D 133/08* (2013.01); *B05D 7/14* (2013.01); *B05D 7/572* (2013.01); *C09D 7/65* (2018.01); *C09D 175/14* (2013.01); *B05D 2202/00* (2013.01); *B05D 2320/00* (2013.01); *B05D 2503/00* (2013.01); *B05D 2508/00* (2013.01)

(58) Field of Classification Search
CPC ...... B05D 7/14; B05D 7/572; B05D 2202/00; B05D 2320/00; B05D 2503/00; B05D 2508/00; C09D 133/066; C09D 151/003; C09D 151/08
See application file for complete search history.

(56) References Cited

U.S. PATENT DOCUMENTS 10,100,220 B2    10/2018   Koyama et al.

FOREIGN PATENT DOCUMENTS

| JP | S60133007 | A |   | 7/1985  |             |
|----|-----------|---|---|---------|-------------|
| JP | 2011116880 | A |   | 6/2011  |             |
| JP | 5995948 | B2 |   | 9/2016  |             |
| WO | WO-2011052304 | A1 | * | 5/2011  | ............ C08F 220/20 |
| WO | WO-2018177731 | A1 | * | 10/2018 | ............ C09D 133/04 |
| WO | WO-2019098013 | A1 | * | 5/2019  | ............ C09D 201/00 |

OTHER PUBLICATIONS

International Search Report and Written Opinion for corresponding PCT/EP2021/078286 mailed Jan. 28, 2022, 9 pages.

* cited by examiner

*Primary Examiner* — Hai Y Zhang
(74) *Attorney, Agent, or Firm* — Armstrong Teasdale LLP

(57) ABSTRACT

Disclosed herein is a method for forming a multilayer coating film by sequentially coating an intermediate coating material composition, a base coating material composition and a clear coating material composition on a metal for a motor vehicle body or resin material and then thermally curing the compositions, where the clear coating material composition is obtained by mixing a main agent (A) and a curing agent (B).

16 Claims, No Drawings

METHOD FOR FORMING MULTILAYER COATING FILM

CROSS-REFERENCE TO RELATED APPLICATIONS

This application is a U.S. National Phase Application of International Patent Application No. PCT/EP2021/078286, filed Oct. 13, 2021, which claims priority to Japanese Patent Application No. 2020-189187, filed Nov. 13, 2020, each of which is hereby incorporated by reference herein.

TECHNICAL FIELD

The present invention relates to a method for forming a multilayer coating film using a curable resin composition for a coating material. More specifically, the present invention relates to a method for forming a multilayer coating film for motor vehicle coating by sequentially coating an intermediate coating material, a base coating material and a clear coating material and then thermally curing.

BACKGROUND ART

In general, methods for forming multilayer coating films in which objects to be coated are motor vehicle bodies are methods comprising forming an electrodeposition coating film on an object to be coated, curing the electrodeposition coating film by heating, and then forming a multilayer coating film comprising an intermediate coating film, a base coating film and a clear coating film. At present, aqueous coating materials have come to be used as intermediate coating materials and base coating materials in order to reduce usage of volatile organic solvents (VOCs).

Furthermore, in order to reduce the amount of energy consumed, many methods that have come to be used in recent years for forming multilayer coating films involve so-called 3-coat-1-bake (3C1B) processes, which comprise forming a base coating film and a clear coating film on a preheated intermediate coating film formed on an electrodeposition coating film, without heating and curing the intermediate coating film formed on the electrodeposition coating film, and then simultaneously heating and curing these three coating films. In methods for forming multilayer coating films using 3C1B processes, however, layer mixing occurred between intermediate coating films and base coating films and good coating film appearance could not be achieved.

Use of an aqueous base coating material composition containing a specific core/shell type emulsion resin, in which the core portion comprises an acrylic resin, the shell portion comprises a urethane resin and the urethane resin contains a specific proportion of constituent units derived from dibasic acids and/or dihydric alcohols having 10-60 carbon atoms, as a base resin is known in order to prevent layer mixing between an intermediate coating film and a base coating film and form a multilayer coating film having excellent surface smoothness in a method for forming a multilayer coating film using this type of 3C1B process (see Patent Document 1).

The method for forming a multilayer coating film in Patent Document 1 prevents layer mixing between an intermediate coating film and a base coating film and can form a multilayer coating film having excellent surface smoothness, but cannot achieve satisfactory adhesion between a coating film surface and a double-sided tape or the like in cases where an external component or the like is bonded to a surface of the cured multilayer coating film using the double-sided tape. Specifically, in cases where an isocyanate curing type clear coating material is coated and the thermal curing temperature of the multilayer coating film is 100° C. or lower, there is room for improvement in terms of adhesion to an external component or the like using a double-sided tape in which an adhesive is an acrylic adhesive.

Patent Document 2 proposes a leveling agent for a coating material, which is characterized by comprising a copolymer having a number average molecular weight of 1,000-60,000, which is obtained by copolymerizing 2-50 mass % of a silicone oil having an acrylate group or a methacrylate group (a monomer component A) and 50-98 mass % of a hydroxyacrylate or hydroxymethacrylate having a primary hydroxy group at a terminal thereof (a monomer component B), wherein the leveling agent yields a smooth coating surface by preventing cissing to dusts of different kinds without impairing interlayer adhesive properties upon re-coating, by adding a small amount of the leveling agent to a coating material. However, this type of leveling agent for a coating material prevents a decrease in interlayer adhesive properties upon re-coating, and cannot improve adhesion to a double-sided tape.

CITATION LIST

Patent Literature

[Patent Document 1] Japanese Patent No. 5995948
[Patent Document 2] Japanese Patent Application Publication No. 2011-116880

SUMMARY OF INVENTION

Problem to be Solved by the Invention

The present invention provides a method for forming a multilayer coating film wherein, even if the baking temperature during thermal curing is relatively low, it is possible to ensure good adhesion between a surface of a thus obtained coating film and an external component or the like and obtain a coating film that exhibits good gasoline resistance and water resistance and has an excellent appearance.

Means for Solving the Problem

As a result of diligent research carried out in order to solve the problem mentioned above, the inventors of the present invention found that by using a specific two-component clear coating material, it was possible to ensure good adhesion between an external component or the like and an obtained surface even if the baking temperature when thermally curing the multilayer coating film is a low temperature such as 100° C. or lower. In particular, the inventors of the present invention found that by using a specific aqueous two-component coating material as an intermediate coating material and using a specific aqueous base coating material as a base coating material, it was possible to obtain a coating film having good water resistance and excellent appearance even if the baking temperature when thermally curing the multilayer coating film is 100° C. or lower.

That is, the present invention provides a method for forming a multilayer coating film by sequentially coating an intermediate coating material, a base coating material and a clear coating material on a metal for a motor vehicle body, on which an electrodeposition coating material has been coated and a formed electrodeposition coating film has been completely baked, and/or a resin material for a motor vehicle exterior, and then thermally curing, wherein the clear coating material composition is obtained by mixing a main agent (A) and a curing agent (B), the main agent (A) contains a hydroxy group-containing acrylic resin (A-1) as a main resin and a surface conditioner (A-2) at a quantity of 0.01-3.0 mass % relative to the mass of solid content in the hydroxy group-containing acrylic resin (A-1), the hydroxy group-containing acrylic resin (A-1) has a hydroxy value of 80-250 mg KOH/g, a mass average molecular weight of 1,000-30,000 and an SP value of 9.0-12.0, the surface conditioner (A-2) is a polymer which has a mass average molecular weight of 3,000-100,000 and is obtained by grafting an acrylic resin (A-2-i) and a resin (A-2-ii), the SP value of the acrylic resin (A-2-i) is 8.5-10.0, and the SP value of the resin (A-2-ii) is at least 2.0 higher than the SP value of the acrylic resin (A-2-i).

The hydroxy group-containing acrylic resin (A-1) preferably comprises a copolymer of a hydroxy group-containing mono (meth)acrylate and other vinyl-based monomers.

The acrylic resin (A-2-i) preferably comprises a copolymer of a plurality of types of vinyl-based monomers.

The resin (A-2-ii) preferably comprises one or more of an acrylic resin, a polyurethane resin and a monovalent polyalkylene oxide containing an ethylene oxide unit.

The surface conditioner (A-2) is preferably a graft polymer in which the acrylic resin (A-2-i)/resin (A-2-ii) mass ratio is 90/10-50/50.

In addition, the intermediate coating material composition used in the present invention is preferably an aqueous two-component type intermediate coating material composition which contains an acrylic urethane resin having a hydroxy value of 20-40 mg KOH/g and an acid value of 20-40 mg KOH/g at a quantity of 20-60 mass % of solid resin content in the main agent and contains a carbodiimide compound having 2 moles or more of carbodiimide groups per molecule as a curing agent, and in which the ratio of the equivalent amount of carbodiimide groups relative to the equivalent amount of carboxylic acid groups contained in the main agent resin is 0.8-1.2.

In addition, the base coating material composition used in the present invention is preferably an aqueous base coating material composition that contains an acrylic urethane resin having a hydroxy value of 20-40 mg KOH/g and an acid value of 20-40 mg KOH/g at a quantity of 20-60 mass % of solid resin content.

In addition, the baking temperature during thermal curing is preferably 75-100° C.

Advantageous Effects of Invention

By using the method for forming a multilayer coating film of the present invention, it is possible to obtain a coating film which can ensure good adhesion to an acrylic double-sided adhesive tape, exhibits good gasoline resistance and water resistance, has excellent appearance and exhibits excellent smoothness and gloss even on an electrodeposited panel whose the surface is highly coarse, even if the baking temperature during thermal curing is 75-100° C. after sequentially coating an intermediate coating material, a base coating material and a clear coating material in a method for forming a multilayer coating film using a 3C1B process.

DESCRIPTION OF EMBODIMENTS

The method for forming a multilayer coating film of the present invention will now be explained in detail. The clear coating material composition used in the present invention is obtained by mixing the main agent (A) and the curing agent (B). The main agent (A) contains, as a main resin, a hydroxy group-containing acrylic resin (A-1) having a hydroxy value of 80-250 mg KOH/g, a mass average molecular weight of 1,000-30,000 g/mol and an SP value of 9.0-12.0.

The hydroxy group-containing acrylic resin (A-1) can be a copolymer of a hydroxy group-containing mono(meth)acrylate and other vinyl-based monomers.

Examples of hydroxy group-containing mono (meth)acrylates include 2-hydroxyethyl (meth)acrylate, 2-hydroxypropyl (meth)acrylate, 3-hydroxypropyl (meth)acrylate and 4-hydroxybutyl (meth)acrylate. Other examples include polycaprolactone-modified polyhydric alcohol mono (meth) acrylates, which are commercially available as, for example, Placcel FA-1 (product name, produced by Daicel, a monomer obtained by ring-opening addition of 1 mole of ε-caprolactone to 1 mole of 2-hydroxyethyl acrylate), Placcel FM-1D, Placcel FM-2D, Placcel FM-3 and Placcel FM-4 (product names, monomers obtained by ring-opening addition of 1 mole, 2 moles, 3 moles or 4 moles of ε-caprolactone to 1 mole of 2-hydroxyethyl methacrylate).

Specific examples of other vinyl-based monomers able to be copolymerized with the hydroxy group-containing mono (meth)acrylate include (meth)acrylic acid, alkyl (meth)acrylates such as methyl (meth)acrylate, ethyl (meth)acrylate, butyl (meth)acrylate, 2-ethylhexyl (meth)acrylate, lauryl (meth)acrylate and stearyl (meth)acrylate, esters of dibasic acids such as itaconic acid, maleic acid and fumaric acid, styrene, nucleus-substituted styrene compounds such as vinyltoluene, dimethylstyrene and ethylstyrene, cyclohexyl (meth)acrylate, glycidyl (meth)acrylate, (meth)acrylonitrile, (meth)acrylamide, vinyl acetate and vinyl chloride. It is possible to use one of these other copolymerizable vinyl-based monomers in isolation, or a combination of two or more types thereof.

The hydroxy value of the hydroxy group-containing acrylic resin (A-1) is 80-250 mg KOH/g, and preferably 100-230 mg KOH/g. In cases where the hydroxy value is less than 80 mg KOH/g, the crosslinking density of a cured coating film is insufficient and gasoline resistance tends to deteriorate. In addition, in cases where the hydroxy value exceeds 250 mg KOH/g, the polarity of the main resin becomes excessively high, compatibility with the curing agent is insufficient, and cloudiness may occur in the coating film. The hydroxy value can be adjusted by copolymerizing a hydroxy group-containing mono(meth)acrylate.

The hydroxy group-containing acrylic resin (A-1) can be obtained by copolymerizing other vinyl-based monomers able to be copolymerized with the hydroxy group-containing mono(meth)acrylate, but the mass average molecular weight thereof is 1,000-30,000 g/mol, preferably 3,000-18,000 g/mol, and more preferably 4,000-16,000 g/mol. In cases where the mass average molecular weight is less than 1,000 g/mol, gasoline resistance may deteriorate. Meanwhile, if the mass average molecular weight exceeds 30,000 g/mol, compatibility with the curing agent deteriorates and defects may occur, such as cloudiness in the coating film. In addition, if the mass average molecular weight exceeds 30,000 g/mol, smoothness deteriorates and an orange peel-like appearance may occur in cases where spray coating is carried out.

In the present specification, mass average molecular weight is a molecular weight determined by gel permeation chromatography (GPC) and calculated on the basis of the molecular weight of polystyrene.

More specifically, molecular weight can be measured by, for example, using a commercially available "HLC8120GPC" (product name, produced by Tosoh Corporation) as a gel permeation chromatograph and using four columns, namely commercially available "TSKgel G2000HXL", "TSKgel G3000HXL", "TSKgel G4000HXL" and "TSKgel G5000HXL" (product names, all produced by Tosoh Corporation), as columns at a measurement temperature of 40° C. and a flow rate of 1 mL/min using tetrahydrofuran as an eluant and using a differential refractive index detector (an RI detector) as a detector.

The hydroxy group-containing acrylic resin (A-1) has a solubility parameter (SP value), as measured using a turbidity method, of 9.0-12.0, and preferably 9.5-11.5. In cases where the SP value is less than 9.0, the gloss of a coating film may decrease, and in cases where the SP value exceeds 12.0, compatibility with the curing agent decreases and cloudiness may occur in a coating film.

Here, SP value is an abbreviation of "solubility parameter", and serves as an indicator of solubility. Polarity increases as the SP value increases, and polarity decreases as the SP value decreases. Specifically, SP value can be measured using a turbidity method described below. At a measurement temperature of 20° C., 0.5 g of a sample resin is weighed out into a 100 mL beaker, 10 mL of acetone is added using a transfer pipette, and the sample is dissolved by stirring with a magnetic stirrer. Next, a low SP solvent (n-hexane) is slowly added dropwise to the dilute solution using a 50 mL burette, and the added amount of the low SP solvent is noted at the point where the resin solution becomes turbid. In addition, a high SP solvent (ion exchanged water) is slowly added dropwise to the dilute solution, and the added amount of the high SP solvent is noted at the point where the resin solution becomes turbid.

The SP value δ of the resin is determined using the following calculational formulae.

$$\delta = (V_{m1}^{1/2} \delta_{m1} + V_{mh}^{1/2} \delta_{mh})/(V_{m1}^{1/2} + V_{mh}^{1/2})$$

$$V_{m1} = V_1 V_2/(\varphi_1 i V_2 + \varphi_2 V_1)$$

$$V_{mh} = V_1 V_3/(\varphi_1 V_3 + \varphi_3 V_1)$$

$$\delta_{m1} = \varphi_1 \delta_1 + \varphi_2 \delta_2$$

$$\delta_{mh} = \varphi_1 \delta_1 + \varphi_3 \delta_3$$

$V_i$: molecular volume of solvent (mL/mol)
[$V_1$, $V_2$ and $V_3$ are the molecular volumes of solvents 1, 2 and 3 (in the present specification solvents 1, 2 and 3 are acetone, hexane and ion exchanged water, respectively. The same applies to δ hereinafter)]
$\varphi i$: the volume percentage of each solvent at the point of turbidity
$\delta_i$: SP value of solvent
[$\delta_1$, $\delta_2$ and $\delta_3$ are the SP values of solvents 1, 2 and 3]
ml: low SP poor solvent mixture
mh: high SP poor solvent mixture The method for polymerizing the hydroxy group-containing acrylic resin (A-1) is not particularly limited, and it is possible to use a conventional method described in publicly known documents, such as a solution radical polymerization method. An example thereof is a method comprising stirring while adding a suitable radical polymerization initiator and a monomer mixture solution dropwise to a suitable solvent at a polymerization temperature of 60-160° C. over a period of 2-10 hours. The radical polymerization initiator used here is not particularly limited as long as this is one commonly used for polymerization, and examples thereof include organic peroxide-based polymerization initiators and azo-based polymerization initiators. The usage quantity of the polymerization initiator is not particularly limited, but is generally 0.1-15 mass %, and preferably 0.5-12 mass %, relative to the total amount of monomers. In addition, the solvent used here is not particularly limited as long as this is a solvent that does not affect the reaction, and it is possible to use aromatic solvents such as toluene and xylene, aliphatic solvents such as mineral spirits, ester-based solvents such as ethyl acetate and butyl acetate, ketone-based solvents such as methyl ethyl ketone, and mixtures of these.

The surface conditioner (A-2) in the present invention is a graft polymer of an acrylic resin (A-2-i) having an SP value of 8.5-10.0 and a resin (A-2-ii) having an SP value that is at least 2.0 higher than the SP value of the acrylic resin (A-2-i).

The acrylic resin (A-2-i) used in the surface conditioner (A-2) in the present invention is an acrylic resin having an SP value of 8.5-10.0, and preferably 8.7-9.8. The acrylic resin (A-2-i) preferably has an SP value that is at least 0.5 lower than that of the hydroxy group-containing acrylic resin (A-1) that is the main resin. If the SP value of the acrylic resin (A-2-i) is lower than the SP value of the hydroxy group-containing acrylic resin (A-1) that is the main resin, the clear coating material of the present invention is oriented on the surface of a coating mist and lowers the surface tension of the mist, thereby contributing to the wettability of a surface to be coated. In cases where the SP value of the acrylic resin (A-2-i) is less than 8.5, compatibility with the hydroxy group-containing acrylic resin (A-1), which is the main resin, is poor and defects such as cissing may occur. In cases where the SP value exceeds 10.0, the advantageous effect of lowering the surface tension of a wet film decreases, orientation on the surface of the wet film decreases and, in cases where an external component or the like is bonded to the outer surface of the multilayer coating film according to the present invention, the advantageous effect of achieving good adhesion by means of a double-sided tape constituted from an acrylic adhesive in particular may decrease.

The acrylic resin (A-2-i) can be synthesized by combining a plurality of vinyl-based monomers able to be copolymerized with each other. Specific examples of vinyl-based monomers include (meth)acrylic acid, alkyl (meth)acrylates such as methyl (meth)acrylate, ethyl (meth)acrylate, butyl (meth)acrylate, 2-ethylhexyl (meth)acrylate, lauryl (meth)acrylate and stearyl (meth)acrylate, esters of dibasic acids such as itaconic acid, maleic acid and fumaric acid, styrene, nucleus-substituted styrene compounds such as vinyltoluene, dimethylstyrene and ethylstyrene, cyclohexyl (meth)acrylate, glycidyl (meth)acrylate, (meth)acrylonitrile, (meth)acrylamide, vinyl acetate and vinyl chloride. It is possible to use one of these copolymerizable vinyl-based monomers in isolation, or a combination of two or more types thereof. The acrylic resin (A-2-i) can be obtained by copolymerizing a hydroxy group-containing mono(meth)acrylate mentioned above.

The resin (A-2-ii) in the present invention is a resin having an SP value that is at least 2.0, and preferably 2.2, higher than that of the acrylic resin (A-2-i). Examples of the resin (A-2-ii) include an acrylic resin, a polyurethane resin and a monovalent polyalkylene oxide containing an ethylene oxide unit.

The surface conditioner (A-2) in the present invention is a polymer obtained by grafting the resin (A-2-ii) onto the acrylic resin (A-2-i). This graft polymer can be produced by using the resin (A-2-ii) as a radical-polymerizable macromonomer and copolymerizing monomers of the acrylic resin (A-2-i).

For example, in cases where the resin (A-2-ii) is an acrylic resin, it is possible to obtain a graft polymer by first producing a macromonomer, in which a radical-polymerizable group such as a (meth)acryloyl group and a styryl group are bonded to one terminal of a polymer skeleton, using a well-known method such as that disclosed in Japanese Patent Application Publication No. S60-133007, and then copolymerizing the obtained macromonomer with monomers of the acrylic resin (A-2-i).

In the present invention, the SP value of the grafting resin (A-2-ii) is taken to be the SP value of the produced macromonomer. In addition, the SP value of the acrylic resin (A-2-i) to be grafted is determined by producing a separate polymer having the monomer composition of the acrylic resin (A-2-i) excluding the macromonomer, and then determining the SP value from measurements of the obtained polymer.

The surface conditioner (A-2) in the present invention is obtained by graft polymerizing the acrylic resin (A-2-i) and the resin (A-2-ii) at a mass ratio of 90/10-50/50. In cases where the mass ratio of the resin (A-2-ii) is less than 10 parts, the advantageous effect of achieving good adhesion between the surface of the multilayer coating film and an acrylic adhesive double-sided tape may decrease. Meanwhile, in cases where the mass ratio of the resin (A-2-ii) exceeds 50 parts, the polarity of the surface conditioner (A-2) becomes excessively high, meaning that orientation on the surface of a wet coating film at the time of coating decreases and the advantageous effect of achieving good adhesion to an acrylic adhesive double-sided tape may decrease.

The mass average molecular weight of the surface conditioner (A-2) in the present invention is 3,000-100,000, preferably 5,000-80,000, and more preferably 10,000-50,000. In cases where this mass average molecular weight is less than 3,000, the advantageous effect of achieving good adhesion between the surface of the multilayer coating film and an acrylic adhesive double-sided tape may decrease. Meanwhile, in cases where this mass average molecular weight exceeds 100,000, compatibility with the hydroxy group-containing acrylic resin (A-1) that is the main resin deteriorates, the advantageous effect of achieving good adhesion to a double-sided tape decreases, and defects such as cissing may occur.

The mass of solid content in the surface conditioner (A-2) in the present invention is 0.01-3.0 mass % relative to the mass of solid content in the main resin (A-1). In cases where the mass of solid content in the surface conditioner (A-2) is less than 0.01 mass %, the advantageous effect of achieving good adhesion between the surface of the multilayer coating film and an acrylic adhesive double-sided tape may decrease. Meanwhile, in cases where the mass of solid content in the surface conditioner (A-2) exceeds 3.0 mass %, clouding may occur at the surface of a cured coating film.

In addition to the hydroxy group-containing resin (A-1) and the surface conditioner (A-2), the main agent (A) of the clear coating material of the present invention may, if necessary, contain organic solvents and a variety of additives, such as ultraviolet radiation absorbers, photostabilizers, antioxidants, surface conditioners other than the surface conditioner (A-2), electrostatic additives, and rheology modifiers such as polyethylene waxes, polyamide waxes and internally crosslinked resin fine particles.

The main agent (A) of the clear coating material of the present invention may be used as the main agent of an uncolored clear coating material or as the main agent of a colored clear coating material containing a coloring agent such as a dye or a pigment.

The clear coating material of the present invention is a two-component clear coating material in which the main agent (A) is mixed with the curing agent (B) immediately before coating and the mixture is then coated.

An aliphatic or alicyclic non-yellowing polyisocyanate compound can be advantageously used as the curing agent used in the clear coating material of the present invention. Typical examples thereof include products of reactions between hexamethylene diisocyanate and/or isophorone diisocyanate and a polyhydric alcohol and/or a low molecular weight polyester polyol, isocyanurates that are polymers of hexamethylene diisocyanate and/or isophorone diisocyanate, and biurets obtained by subjecting a urethane bond to a further reaction. It is possible to use one of these isocyanate compounds in isolation, or a combination of two or more types thereof. An isocyanurate of hexamethylene diisocyanate is particularly preferred as the curing agent used in the clear coating material of the present invention.

The content of the curing agent used in the clear coating material of the present invention is such that the molar ratio (NCO/OH) of the number of hydroxy functional groups in the hydroxy group-containing acrylic resin (A-1) and the number of isocyanate functional groups (NCO groups) in the curing agent is preferably 0.5-2.0, and more preferably 0.8-1.5.

The intermediate coating material composition of the present invention is an aqueous two-component type intermediate coating material composition which contains an acrylic urethane resin having a hydroxy value of 20-40 mg KOH/g and an acid value of 20-40 mg KOH/g at a quantity of 20-60 mass % of solid resin content in the main agent and which contains a carbodiimide compound and/or an isocyanate compound or the like as a curing agent. The curing agent is preferably a carbodiimide compound having 2 moles or more of carbodiimide groups per molecule. In addition, the ratio of the equivalent amount of carbodiimide groups in the carbodiimide compound is preferably 0.8-1.2 relative to the equivalent amount of carboxylic acid groups contained in the main agent resin.

It is possible to incorporate a variety of pigments, such as coloring pigments, glittery pigments and body pigments, in the intermediate coating material composition of the present invention. Examples of coloring pigments include inorganic pigments such as chrome yellow, yellow iron oxide, iron oxide, carbon black and titanium dioxide; and organic pigments such as azo chelate pigments, insoluble azo pigments, condensed azo pigments, phthalocyanine pigments, indigo pigments, perynone pigments, perylene pigments, dioxane pigments, quinacridone pigments, isoindolinone pigments and metal complex pigments. In addition, examples of glittery pigments include aluminum flake pigments, alumina flake pigments, mica pigments, silica flake pigments and glass flake pigments. In addition, examples of body pigments include calcium carbonate, baryte, precipitated barium sulfate, clay and talc. It is possible to use one of these pigments in isolation, or a combination of 2 or more types thereof.

In cases where a pigment is added to the intermediate coating material composition of the present invention, the mass ratio thereof is, for example, preferably 3-200 mass %, more preferably 30-170 mass %, and further preferably 50-150 mass %, relative to the total amount of resin solid content in a base resin.

One or more types of additive, such as surface modifiers, anti-foaming agents, surfactants, auxiliary film-forming agents, preservatives, ultraviolet radiation absorbers, photo-stabilizers and antioxidants, rheology control agents, and organic solvents, may be incorporated in the intermediate coating material composition of the present invention.

Specific examples of rheology control agents include gum Arabic, arabinogalactan, alginic acid and salts thereof, curdlan, ghatti gum, carrageenan, karaya gum, agar, xanthan gum, guar gum, enzymatically degraded guar gum, quince seed gum, gellan gum, gelatin, tamarind seed gum, indigestible dextrin, gum tragacanth, furcellaran, pullulan, pectin, polydextrose, galactomannan, locust bean gum, water-soluble polymers, such as water-soluble soy bean saccharides, carboxymethyl cellulose, metal salts of carboxymethyl cellulose, methyl cellulose, hydroxyethyl cellulose and sodium polyacrylate, and smectite-based clay minerals. It is possible to use one of these substances in isolation, or a mixture of two or more types thereof.

The intermediate coating material composition of the present invention contains water as a medium, but the intermediate coating material composition may, if necessary, be coated after being diluted to an appropriate viscosity by using water or, according to circumstances, a small quantity of an organic solvent or an amine.

By using the aqueous two-component type intermediate coating material composition of the present invention, it is possible to prevent layer mixing between an intermediate coating film and a base coating film and form a multilayer coating film having excellent surface smoothness even in a method for forming a multilayer coating film using this type of 3C1B process by forming a base coating film and a clear coating film on a preheated intermediate coating film without heating and curing the intermediate coating film and then simultaneously heating and curing these three coating films.

The base coating material composition used in the present invention can be an aqueous base coating material composition that contains an acrylic urethane resin having a hydroxy value of 20-40 mg KOH/g and an acid value of 20-40 mg KOH/g at a quantity of 20-60 mass % of solid resin content.

It is possible to incorporate a variety of pigments, such as coloring pigments, glittery pigments and body pigments, in the base coating material composition of the present invention. Examples of coloring pigments include inorganic pigments such as chrome yellow, yellow iron oxide, iron oxide, carbon black and titanium dioxide; and organic pigments such as azo chelate pigments, insoluble azo pigments, condensed azo pigments, phthalocyanine pigments, indigo pigments, perynone pigments, perylene pigments, dioxane pigments, quinacridone pigments, isoindolinone pigments and metal complex pigments. In addition, examples of glittery pigments include aluminum flake pigments, alumina flake pigments, mica pigments, silica flake pigments and glass flake pigments. In addition, examples of body pigments include calcium carbonate, baryte, precipitated barium sulfate, clay and talc. It is possible to use one of these pigments in isolation, or a combination of 2 or more types thereof.

In cases where a pigment is added to the base coating material composition of the present invention, the mass ratio thereof is, for example, preferably 3-200 mass %, more preferably 30-170 mass %, and further preferably 50-150 mass %, relative to the total amount of resin solid content in the base resin.

One or more types of additive, such as surface modifiers, anti-foaming agents, surfactants, auxiliary film-forming agents, preservatives, ultraviolet radiation absorbers, photo-stabilizers and antioxidants, rheology control agents, and organic solvents, may be incorporated in the base coating material composition of the present invention.

Specific examples of rheology control agents include gum Arabic, arabinogalactan, alginic acid and salts thereof, curdlan, ghatti gum, carrageenan, karaya gum, agar, xanthan gum, guar gum, enzymatically degraded guar gum, quince seed gum, gellan gum, gelatin, tamarind seed gum, indigestible dextrin, gum tragacanth, furcellaran, pullulan, pectin, polydextrose, galactomannan, locust bean gum, water-soluble polymers, such as water-soluble soy bean saccharides, carboxymethyl cellulose, metal salts of carboxymethyl cellulose, methyl cellulose, hydroxyethyl cellulose and sodium polyacrylate, and smectite-based clay minerals. It is possible to use one of these substances in isolation, or a mixture of two or more types thereof.

The base coating material composition of the present invention contains water as a medium, but the base coating material composition may, if necessary, be coated after being diluted to an appropriate viscosity by using water or, according to circumstances, a small quantity of an organic solvent or an amine.

The base coating material composition of the present invention may not contain a curing agent, but in cases where a curing agent is contained, examples thereof include amino resins, polyisocyanate compounds, blocked polyisocyanate compounds and polycarbodiimide compounds. Of these, polyisocyanate compounds and polycarbodiimide compounds are preferred from the perspective of coating film appearance. In addition, it is possible to use one of these curing agents in isolation, or a combination of two or more types thereof.

By using the aqueous base coating material mentioned above, it is possible to form a coating film having particularly excellent water resistance even at a thermal curing temperature of 100° C. or lower.

Methods commonly used in the motor vehicle industry, such as air spray coating, air atomization electrostatic coating or rotary bell atomization electrostatic coating, can be used as methods for coating the coating materials in the method for forming a multilayer coating film of the present invention.

In the method for forming a multilayer coating film of the present invention, coating conditions for the aqueous intermediate coating material and the aqueous base coating material are preferably a temperature of 10-40° C. and a relative humidity of 65-85%.

In the method for forming a multilayer coating film of the present invention, preheating may be carried out after the aqueous intermediate coating material has been coated or after the aqueous base coating material has been coated, but in cases where the aqueous base coating material composition of the present invention is used, it is possible to achieve excellent coating film appearance even if preheating is not carried out after the aqueous intermediate coating material has been coated. Moreover, in cases where preheating is carried out, the preheating temperature is preferably 30-100° C. and the preheating time is preferably 3-10 minutes.

In the method for forming a multilayer coating film of the present invention, the thermal curing temperature is 100° C. or lower, and preferably 75-90° C. The heating time is preferably 20-120 minutes.

An object-to-be-coated in the method for forming a multilayer coating film of the present invention is a metal on which an electrodeposition coating film has been formed, which are commonly used in motor vehicle bodies, and/or a resin material, but it is possible to include a step for coating a primer or the like before the aqueous intermediate coating material is coated.

WORKING EXAMPLES

The present invention will now be explained in greater detail through the use of working examples, but is in no way limited to these working examples. Unless explicitly stated otherwise, parts, percentages and ratios in the examples mean parts by mass, mass % and mass ratios.

Production Example 1: Production of Polyester Resin Varnish 54.0 parts of a dimer acid (product name "PRIPOL 1017", produced by CRODA, number of carbon atoms: 36), 8.0 parts of neopentyl glycol, 17.76 parts of isophthalic acid, 19.41 parts of 1,6-hexane diol and 0.81 parts of trimethylolpropane were placed in a reaction vessel equipped with a reflux condenser having a reaction water separator fitted thereto, a nitrogen gas introduction device, a thermometer and a stirrer, the temperature was increased to 120° C. so as to dissolve the raw materials, and the temperature was then increased to 160° C. while stirring the contents of the reaction vessel. The temperature was maintained at 160° C. for 1 hour, and then gradually increased to 230° C. over a period of 5 hours. A polyester resin varnish, which had a solid resin content of 74.6%, a resin hydroxy value of 62 mg KOH/g, a resin acid value of 4 mg KOH/g and a mass average molecular weight of 3,200, was obtained by allowing a reaction to continue while maintaining a temperature of 230° C., cooling to a temperature of 80° C. or lower when the resin acid value reached 4 mg KOH/g, and then adding 31.6 parts of methyl ethyl ketone.

Production Example 2: Production of Polyurethane Resin 78.9 parts of the polyester resin varnish obtained in Production Example 1, 7.8 parts of dimethylolpropionic acid, 1.5 parts of neopentyl glycol and 40.0 parts of methyl ethyl ketone were placed in a reaction vessel equipped with a nitrogen gas introduction device, a thermometer and a stirrer, the temperature was increased to 80° C. while stirring the contents of the reaction vessel, 27.8 parts of isophorone diisocyanate was added, and the components were allowed to react while maintaining a temperature of 80° C. When the isocyanate value reached 0.43 meq/g, 4.0 parts of neopentyl glycol was added, and a reaction was allowed to continue at a temperature of 80° C. In addition, when the isocyanate value reached 0.01 meq/g, 33.3 parts of butyl cellosolve was added and the reaction was terminated. Next, the temperature was increased to 100° C. and methyl ethyl ketone was removed under reduced pressure. A polyurethane resin, which had a solid resin content of 35.0%, a resin hydroxy value of 21 mg KOH/g, a resin acid value of 35 mg KOH/g and a mass average molecular weight of 7,800, was obtained by lowering the temperature to 50° C., adding 4.0 parts of dimethylethanolamine so as to neutralize acid groups, and adding 147.9 parts of deionized water.

Production Example 3: Production of Acrylic Urethane Resin 46.4 parts of the polyurethane resin obtained in Production Example 2 and 33.1 parts of deionized water were placed in a reaction vessel equipped with a nitrogen gas introduction device, a thermometer, a dropping funnel and a stirrer, the temperature was increased to 85° C. while stirring the contents of the reaction vessel, and a homogeneous mixture comprising 4.92 parts of styrene, 5.5 parts of methyl methacrylate, 4.02 parts of n-butyl acrylate, 1.62 parts of 2-hydroxyethyl methacrylate, 0.21 parts of acrylic acid, 3.9 parts of propylene glycol monomethyl ether and 0.2 parts of the polymerization initiator t-butylperoxy-2-ethylhexanoate as dropwise addition components was added dropwise over a period of 3.5 hours using the dropping funnel. Following completion of the dropwise addition, a core/shell type acrylic urethane resin, in which the acrylic resin/urethane resin ratio was 50/50 and which had a solid resin content of 32.5%, a resin hydroxy value of 32 mg KOH/g and a resin acid value of 23 mg KOH/g, was obtained by maintaining a temperature of 85° C. for 1 hour, adding a polymerization initiator solution obtained by dissolving 0.03 parts of the polymerization initiator t-butylperoxy-2-ethylhexanoate in 0.11 parts of propylene glycol monomethyl ether as an additional catalyst, and terminating the reaction after maintaining a temperature of 85° C. for a further 1 hour.

Production Example 4: Production of Aqueous Intermediate Coating Material Composition A pigment paste was prepared by adding 29.29 parts of titanium dioxide (product name "Ti-Pure R706", produced by DuPont) and 0.3 parts of carbon black (product name "MA-100", produced by Mitsubishi Chemical Corp.) to 36.12 parts of the polyurethane resin obtained in Production Example 2 and then dispersing in a motor mill.

Next, a resin base was prepared by mixing 19.46 parts of the core/shell type acrylic urethane resin obtained in Production Example 3 and 4.49 parts of an aqueous acrylic resin (product name "SETAQUA 6511", produced by Nuplex Resins, acid value 8 mg KOH/g, hydroxy value 138 mg KOH/g, solid resin content 47%) in a dissolver, and this resin base was added to the previously prepared pigment paste and mixed. As a curing agent, 10.34 parts of a carbodiimide compound (product name "Carbodiimide V02-L2", produced by Nisshinbo Chemical Inc., solid resin content: 40%, carbodiimide group equivalent amount: 385) was mixed immediately before coating. This aqueous intermediate coating material composition contained an acrylic urethane resin at a quantity of 25 mass % of the solid resin content, and the ratio of carbodiimide group equivalent amount relative to the equivalent amount of carboxylic acid groups contained in the main agent resin was 1.0.

Production Example 5: Production of Base Coating Material Composition

A pigment paste was prepared by adding 1.55 parts of carbon black (product name "MA-100", produced by Mitsubishi Chemical Corp.) to 50.5 parts of the polyurethane resin obtained in Production Example 2 and then dispersing in a motor mill.

Next, a resin base was prepared by mixing 27.21 parts of the core/shell type acrylic urethane resin obtained in Production Example 3 and 6.28 parts of an aqueous acrylic resin (product name "SETAQUA 6511", produced by Nuplex Resins, acid value 8 mg KOH/g, hydroxy value 138 mg KOH/g, solid resin content 47%) in a dissolver, and this resin base was added to the previously prepared pigment paste and mixed. As a curing agent, 14.46 parts of a carbodiimide compound (product name "Carbodiimide V02-L2", produced by Nisshinbo Chemical Inc., solid resin content: 40%, carbodiimide group equivalent amount: 385)

was mixed immediately before coating. This aqueous base coating material composition contained an acrylic urethane resin at a quantity of 25 mass % of the solid resin content, and the ratio of carbodiimide group equivalent amount relative to the equivalent amount of carboxylic acid groups contained in the main agent resin was 1.0.

Production Example 6: Production of Hydroxy Group-Containing Acrylic Resin Varnish A-1-1

27.0 parts of xylene and 9.0 parts of propylene glycol monomethyl ether acetate were charged in a flask equipped with a thermometer, a reflux condenser, a stirrer, a dropping funnel and a nitrogen gas introduction device, and heated while stirring and introducing nitrogen gas, and a temperature of 130° C. was maintained. Next, 6.0 parts of styrene, 0.8 parts of acrylic acid, 16.7 parts of 2-hydroxyethyl methacrylate and 36.6 parts of n-butyl methacrylate as radical-polymerizable monomers and 1.0 parts of t-butylperoxy-2-ethylhexanoate as a polymerization initiator were homogeneously mixed, and this mixture was then added dropwise from the dropping funnel at the same rate over a period of 3 hours at a temperature of 130° C. Following completion of the dropwise addition, a temperature of 130° C. was maintained for 1 hour, and the reaction temperature was then lowered to 110° C.

A hydroxy group-containing acrylic resin varnish A-1-1 was then obtained by adding 0.1 parts of t-butylperoxy-2-ethylhexanoate, which is a polymerization initiator, as an additional catalyst, maintaining a temperature of 110° C. for a further 2 hours, adding 2.9 parts of xylene to thin the mixed liquid, and then cooling.

Production Example 7: Production of Hydroxy Group-Containing Acrylic Resin Varnish A-1-2

A hydroxy group-containing acrylic resin varnish A-1-2 was obtained using a production method similar to that used for A-1-1, except that the charged amounts of raw materials were changed as shown in Table 1.

TABLE 1

| | | Production Example 6 | Production Example 7 |
|---|---|---|---|
| Hydroxy group-containing acrylic resin (A-1) varnish | | A-1-1 | A-1-2 |
| Initially charged solvent | Xylene | 27.0 | 27.0 |
| | Propylene glycol monomethyl ether acetate | 9.0 | 9.0 |
| Monomers added dropwise | Styrene | 6.0 | 6.0 |
| | Acrylic acid | 0.8 | 0.8 |
| | 2-hydroxyethyl methacrylate | 16.7 | |
| | 2-hydroxyethyl acrylate | | 28.5 |
| | n-butyl methacrylate | 36.6 | 3.7 |
| | Acrylonitrile | | 9.0 |
| Catalyst | t-butylperoxy-2-ethyl hexanoate | 1.0 | 1.0 |

TABLE 1-continued

| | | Production Example 6 | Production Example 7 |
|---|---|---|---|
| Additional catalyst | t-butylperoxy-2-ethyl hexanoate | 0.1 | 0.1 |
| Thinning solvent | Xylene | 2.9 | 2.9 |
| | Total | 100.0 | 100.0 |
| | Hydroxy value (mg KOH/g) of resin | 120 | 230 |
| | Mass average molecular weight | 10,000 | 10,000 |
| | SP value | 10.6 | 12.5 |
| | Solids content (%) | 60 | 60 |

Production Example 8: Production of Surface Conditioner A-2-a

A macromonomer (A-2-ii) (mass average molecular weight 4,000) of an acrylonitrile/methyl acrylate copolymer having a methacryloyl group at one terminal was produced using the following method from a monomer composition that constitutes a part (a basic structure) of the resin (A-2-ii) in Table 2, that is, from 15 parts of acrylonitrile and 15 parts of methyl methacrylate.

50.0 parts of butyl acetate was charged in a flask equipped with a thermometer, a reflux condenser, a stirrer, a dropping funnel and a nitrogen gas introduction device, and a mixed liquid comprising 23.85 parts of acrylonitrile, 23.85 parts of methyl methacrylate, 1.29 parts of 3-mercaptopropionic acid and 1.0 parts of azobisisobutyronitrile was homogeneously mixed while stirring and introducing nitrogen gas, and the obtained mixture was added dropwise from the dropping funnel at the same rate over a period of 4 hours at 80° C. Following completion of the dropwise addition, a temperature of 80° C. was maintained for 2 hours, the reaction temperature was then increased to 95° C., and this temperature was maintained for 1 hour. The obtained prepolymer reaction liquid had an acid value of 6.8 mg KOH/g. The mass of the prepolymer reaction liquid after heating for 1 hour at 130° C. was 50.0% of the mass before heating.

Next, 3.32 parts of glycidyl methacrylate, 0.48 parts of tetrabutyl ammonium bromide as a catalyst and 0.02 parts of hydroquinone monomethyl ether as a polymerization inhibitor were added to 96.18 parts of this prepolymer reaction liquid, and the obtained mixture was reacted for 8 hours at a reaction temperature of 90° C. The heating residue of the obtained macromonomer solution was 51.3% after heating for 1 hour at 130° C. The obtained macromonomer had an acid value of 0.03 mg KOH/g or less and an SP value of 11.5.

A solution of a surface conditioner (A-2-a) having a solid resin content of 50% and a mass average molecular weight of 30,000 was obtained by copolymerizing 65.3 parts of the macromonomer solution, which included 30 parts of the macromonomer, and monomers of the acrylic resin (A-2-i) shown in Table 2 (35.0 parts of stearyl methacrylate and 35.0 parts by weight of 2-ethylhexyl acrylate) in xylene using t-butylperoxy-2-ethylhexanoate as a polymerization initiator.

Separately, an acrylic resin (A-2-i) having a solid resin content of 50% and a mass average molecular weight of 10,000 was produced by copolymerizing monomers of the acrylic resin (A-2-i) (a monomer mixture comprising 35.0 parts of stearyl methacrylate and 35.0 parts of 2-ethyhexyl acrylate) in xylene using t-butylperoxy-2-ethylhexanoate as a polymerization initiator, and this acrylic resin (A-2-i) had a measured SP value of 9.1.

TABLE 2

|  |  | Production Example 8 | Production Example 9 | Production Example 10 | Production Example 11 | Production Example 12 | Production Example 13 | Production Example 14 |
|---|---|---|---|---|---|---|---|---|
| Surface conditioner (A-2) | | A-2-a | A-2-b | A-2-c | A-2-d | A-2-e | A-2-f | A-2-g |
| Acrylic resin (A-2-i) monomer composition | 2-hydroxyethyl methacrylate | | 17.5 | | | | | |
| | Stearyl methacrylate | 35.0 | 24.5 | 35.0 | 47.5 | 20.0 | 35.0 | 35.0 |
| | 2-ethylhexyl acrylate | 35.0 | 28.0 | 35.0 | 47.5 | 20.0 | 35.0 | 35.0 |
| Resin (A-2-ii) monomer composition | Acrylonitrile | 15.0 | 15.0 | 9.0 | 2.5 | 30.0 | 15.0 | 15.0 |
| | Methyl methacrylate | 15.0 | 6.0 | 15.0 | 2.5 | 30.0 | 15.0 | 15.0 |
| | 2-hydroxyethyl methacrylate | | 9.0 | | | | | |
| | 2-ethylhexyl acrylate | | | 6.0 | | | | |
| Total | | 100.0 | 100.0 | 100.0 | 100.0 | 100.0 | 100.0 | 100.0 |
| SP value of acrylic resin (A-2-i) | | 9.1 | 10.5 | 9.1 | 9.1 | 9.1 | 9.1 | 9.1 |
| SP value of resin (A-2-ii) | | 11.5 | 12.9 | 10.7 | 11.5 | 11.5 | 11.5 | 11.5 |
| Difference between SP value of resin (A-2-ii) and SP value of acrylic esin (A-2-i) | | 2.4 | 2.4 | 1.6 | 2.4 | 2.4 | 2.4 | 2.4 |
| Acrylic resin (A-2-i)/resin (A-2-ii) mass ratio | | 70/30 | 70/30 | 70/30 | 95/5 | 40/60 | 70/30 | 70/30 |
| Mass average molecular weight | | 30,000 | 30,000 | 30,000 | 30,000 | 30,000 | 2,000 | 150,000 |

Production Examples 9-14: Production of Surface Conditioners A-2-b to A-2-g

In the same way as in the production of surface conditioner A-2-a, solutions of surface conditioners (A-2-b to A-2-g), which had property values shown in Table 2, were produced by first producing a macromonomer (A-2-ii) having a methacryloyl group at one terminal from the monomer composition of the resin (A-2-ii) shown in Table 2, and then copolymerizing the macromonomer and the monomers of the acrylic resin (A-2-i) shown in Table 2 in xylene using t-butylperoxy-2-ethylhexanoate as a polymerization initiator.

Separately, acrylic resins (A-2-i) having a solid resin content of 50% and a mass average molecular weight of 10,000 were produced by copolymerizing the monomer mixture of the acrylic resin (A-2-i) shown in Table 2 in xylene using t-butylperoxy-2-ethylhexanoate as a polymerization initiator, and the SP values of these acrylic resins were measured.

Working Examples 1-3 and Comparative Examples 1-7

Two-component type clear coating material compositions were produced by sequentially mixing the raw materials of the main agent shown in Table 3, stirring until homogeneously mixed, and then combining the main agent and a curing agent as shown in this table.

TABLE 3

|  |  |  | Working Example 1 | Working Example 2 | Working Example 3 | Working Example 4 | Working Example 5 | Comparative Example 1 | Comparative Example 2 |
|---|---|---|---|---|---|---|---|---|---|
| | Clear coating material | | CC-1 | CC-2 | CC-3 | CC-4 | CC-5 | CC-6 | CC-7 |
| Main agent | Hydroxy group-containing acrylic resin (A-1) varnish | A-1-1 | 66.7 | 66.7 | 66.7 | 66.7 | 66.7 | 66.7 | 66.7 |
| | | A-1-2 | | | | | | | |
| | 50% xylene solution of surface conditioner (A-2) | A-2-a | 0.8 | 0.4 | 1.6 | | | | 4.0 |
| | | A-2-b | | | | | | | |
| | | A-2-c | | | | | | | |
| | | A-2-d | | | | 0.8 | | | |
| | | A-2-e | | | | | 0.8 | | |
| | | A-2-f | | | | | | | |
| | | A-2-g | | | | | | | |
| | Ultraviolet radiation absorber | Tinuvin 384-2 | 1.5 | 1.5 | 1.5 | 1.5 | 1.5 | 1.5 | 1.5 |

TABLE 3-continued

|  |  |  |  |  |  |  |  |  |
|---|---|---|---|---|---|---|---|---|
| | Photostabilizer | Tinuvin 292 | 1.0 | 1.0 | 1.0 | 1.0 | 1.0 | 1.0 | 1.0 |
| | 10% solution of silicone-based surface conditioner | 10% solution of BYK-300 | 0.2 | 0.2 | 0.2 | 0.2 | 0.2 | 0.2 | 0.2 |
| | Solvent | Solvesso 100 | 13.4 | 13.8 | 12.6 | 13.4 | 13.4 | 14.2 | 10.2 |
| Curing agent | Iscoyanate compound | Sumidur N3300 | 16.5 | 16.5 | 16.5 | 16.5 | 16.5 | 16.5 | 16.5 |
| | Total | | 100.0 | 100.0 | 100.0 | 100.0 | 100.0 | 100.0 | 100.0 |

| | | | Comparative Example 3 | Comparative Example 4 | Comparative Example 5 | Comparative Example 6 | Comparative Example 7 | Comparative Example 8 |
|---|---|---|---|---|---|---|---|---|
| | Clear coating material | | CC-8 | CC-9 | CC-10 | CC-11 | CC-12 | CC-13 |
| Main agent | Hydroxy group-containing acrylic resin (A-1) varnish | A-1-1 | 66.7 | | 66.7 | 66.7 | 66.7 | 66.7 |
| | | A-1-2 | | 53.3 | | | | |
| | 50% xylene solution of surface conditioner (A-2) | A-2-a | 8.0 | 0.6 | | | | |
| | | A-2-b | | | 0.8 | | | |
| | | A-2-c | | | | 0.8 | | |
| | | A-2-d | | | | | | |
| | | A-2-e | | | | | | |
| | | A-2-f | | | | | 0.8 | |
| | | A-2-g | | | | | | 0.8 |
| | Ultraviolet radiation absorber | Tinuvin 384-2 | 1.5 | 1.5 | 1.5 | 1.5 | 1.5 | 1.5 |
| | Photostabilizer | Tinuvin 292 | 1.0 | 1.0 | 1.0 | 1.0 | 1.0 | 1.0 |
| | 10% solution of silicone-based surface conditioner | 10% solution of BYK-300 | 0.2 | 0.2 | 0.2 | 0.2 | 0.2 | 0.2 |
| | Solvent | Solvesso 100 | 6.2 | 18.1 | 13.4 | 13.4 | 13.4 | 13.4 |
| Curing agent | Iscoyanate compound | Sumidur N3300 | 16.5 | 25.3 | 16.5 | 16.5 | 16.5 | 16.5 |
| | Total | | 100.0 | 100.0 | 100.0 | 100.0 | 100.0 | 100.0 |

<< Table notes>>
1) Tinuvin 384-2: product name, produced by BASF Japan, benzotriazole-based ultraviolet radiation absorber (solids content 95 mass %)
2) Tinuvin 292: product name, produced by BASF Japan photostabilizer
3) BYK-300: product name, produced by BYK Japan, silicon-based surface conditioner (solids content 52 mass %)
4) Solvesso 100: product name, produced by Exxon Mobil, aromatic hydrocarbon-based solvent
5) Sumidur N3300: product name, produced by Sumika Covestro Urethane Co., Ltd., isocyanurate type resin of 1,6-hexamethylene diisocyanate (solids content 100 mass %, NCO content 21.8 mass %)

<<Production of Evaluation Panel 1 by Coating Steel Panel Having Electrodeposition Coating Film Formed Thereon>>

A cationic electrodeposition coating material (product name "Cathoguard No. 500" produced by BASF Coatings) was electrodeposited on a zinc phosphate-treated mild steel panel so as to attain a dried film thickness of 20 μm, and then baked for 25 minutes at 175° C. so as to obtain an electrodeposition coating film panel used for the present evaluation (hereinafter referred to as an "electrodeposited panel").

Next, an evaluation panel 1 was produced by means of the following procedure using a rotary atomization type bell coating machine (product name "Metallic Bell G1-COPES Bell", produced by ABB) under coating conditions of a temperature of 25° C. and a relative humidity of 75%. Moreover, in the multilayer coating film formation described below, the intermediate coating material and the base coating material were coated after being diluted with deionized water so that the viscosity measured using a No. 4 Ford cup was 40 seconds (20° C.).

The intermediate coating material was coated on the electrodeposited panel so as to attain a dried film thickness of 20 μm. The coated panel was then allowed to stand at room temperature for 5 minutes, after which the base coating material was coated so as to attain a dried film thickness of 12 μm. After being coated, the panel was allowed to stand at room temperature for 5 minutes, and then pre-heated for 3 minutes at 80° C. This coated panel was then allowed to cool to room temperature. Next, a mixture was obtained by mixing a main agent of clear coating materials CC-1 to CC-10 shown in Table 3 and a curing agent immediately before coating and diluting with Solvesso 100 so that the viscosity measured using a No. 4 Ford cup was 25 seconds (20° C.), and this mixture was coated on the coated panel adjusted to room temperature so as to attain a dried film thickness of 30 μm. Following the coating, the coated panel was allowed to stand at room temperature for 10 minutes and then baked for 30 minutes at 80° C. so as to obtain an evaluation panel 1 of an electrodeposited panel.

<<Production of Evaluation Panel 2 by Coating Resin Material>>

A coated resin panel (hereinafter referred to as a "resin panel") used in the present evaluation was obtained by spray coating a degreased polypropylene panel measuring 70×150×3 mm with a primer coating material (product name "Plymac No. 1501", produced by BASF Coatings) so as to attain a dried film thickness of 10 μm.

Next, an evaluation panel 2 was produced by means of the following procedure using a rotary atomization type bell coating machine (product name "Metallic Bell G1-COPES Bell", produced by ABB) under coating conditions of a temperature of 25° C. and a relative humidity of 75%. Moreover, in the multilayer coating film formation described below, the intermediate coating material and the base coating material were coated after being diluted with deionized water so that the viscosity measured using a No. 4 Ford cup was 40 seconds (20° C.).

The intermediate coating material was coated on the resin panel so as to attain a dried film thickness of 20 μm. The coated panel was then allowed to stand at room temperature for 5 minutes, after which the base coating material was coated so as to attain a dried film thickness of 12 μm. After being coated, the panel was allowed to stand at room temperature for 5 minutes, and then pre-heated for 3 minutes at 80° C. After allowing the coated panel to cool to room temperature, a mixture was obtained by mixing a main agent of clear coating materials CC-1 to CC-10 shown in Table 3 and a curing agent immediately before coating and diluting with Solvesso 100 so that the viscosity measured using a No. 4 Ford cup was 25 seconds (20° C.), and this mixture was coated on the resin panel so as to attain a dried film thickness of 30 μm. After being coated, the panel was allowed to stand at room temperature for 10 minutes and then baked for 30 minutes at 80° C. so as to obtain an evaluation panel 2 of a resin panel.

<<Methods for Evaluating Evaluation Panels>>

The obtained evaluation panels 1 and 2 were subjected to the following coating film performance evaluations.

(1) Coating Film Appearance

Each obtained evaluation panel was evaluated through visual observations in terms of coating film appearance according to the following criteria. Moreover, evaluation results are the average of observational results from 20 evaluators.

⊚: A fluorescent lamp was reflected very clearly when the fluorescent lamp was shone on the coating film.

○: A fluorescent lamp was reflected less clearly when the fluorescent lamp was shone on the coating film.

Δ: The periphery (outline) of a fluorescent lamp was blurred when the fluorescent lamp was shone on the coating film.

x: The periphery (outline) of a fluorescent lamp was very blurred when the fluorescent lamp was shone on the coating film.

(2) Water Resistance

After being produced, an evaluation panel was allowed to stand for 1 week at room temperature and then immersed in pure water at 40° C. and left in the water for 240 hours. Following the immersion, the coating film was evaluated through visual observations according to the following criteria. Moreover, evaluation results are the average of observational results from 20 evaluators.

○: No cloudiness observed.

Δ: Slight cloudiness observed.

x: Significant cloudiness observed.

(3) Gasoline Resistance

A test panel was immersed for 24 hours in regular unleaded gasoline (described in JIS K2202 #2) at 20° C., and the appearance of the test panel was then evaluated through visual observations according to the following criteria. Moreover, evaluation results are the average of observational results from 20 evaluators.

○: No anomalies observed.

Δ: Slight anomalies such as yellowing or swelling observed.

x: Anomalies such as yellowing or swelling observed.

(4) Double-Sided Tape Adhesion

Acrylic Foam Tape GT5912 produced by 3M Japan Ltd. was used as a double-sided tape in which the adhesive was an acrylic adhesive, and this tape was cut to a size of 30 mm×30 mm. The double-sided tape cut in the manner described above was bonded to an upper surface of an L-shaped jig, which was formed by bending a stainless steel plate having a thickness of 1 mm, a width of 30 mm and the length of 80 mm at an angle of 90° at a position 30 mm from the top of the plate, that is, bonded to an area measuring 30 mm×30 mm, so as to cover the entire upper surface. Next, the upper surface of the L-shaped jig was bonded to the central part of evaluation panels 1 and 2 having dimensions of 70 mm×150 mm while confirming that there was no gap whatsoever between the evaluation panel and the upper surface and no tape misalignment. With the L-shaped jig sticking downwards from the evaluation panel, both edges of the evaluation panel were supported, and a 2 kg of 3 kg weight was suspended from the L-shaped jig and left in this position for 7 days at room temperature. Evaluations were carried out according to the following criteria.

⊚: When a 3 kg weight was suspended, the double-sided tape was not detached after 7 days or more.

○: When a 2 kg weight was suspended, the double-sided tape was not detached after 7 days or more.

Δ: When a 2 kg weight was suspended, the double-sided tape was detached after not less than 2 days but less than 7 days.

x: When a 2 kg weight was suspended, the double-sided tape was detached after less than 2 days.

For tests (1) to (4) above, results for the evaluation panel 1 of an electrodeposited panel are shown in Table 4 and results for the evaluation panel 2 of a resin panel are shown in Table 5.

TABLE 4

| | | Working Example 1 | Working Example 2 | Working Example 3 | Working Example 4 | Working Example 5 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|---|
| | Clear coating material | CC-1 | CC-2 | CC-3 | CC-4 | CC-5 | CC-6 | CC-7 | CC-8 | CC-9 | CC-10 | CC-11 | CC-12 | CC-13 |
| Main agent | Hydroxy group-containing acrylic resin (A-1) A-1-1 | 66.7 | 66.7 | 66.7 | 66.7 | 66.7 | 66.7 | 66.7 | 66.7 | 53.3 | 66.7 | 66.7 | 66.7 | 66.7 |
| | A-1-2 | | | | | | | | | | | | | |
| | 50% xylene solution of surface conditioner (A-2) A-2-a | 0.8 | 0.4 | 1.6 | | | | | | | | | | |
| | A-2-b | | | | | | | | | | | | | |
| | A-2-c | | | | | | | | 4.0 | | | | | |
| | A-2-d | | | | 0.8 | | | | | | | | | |
| | A-2-e | | | | | 0.8 | | | | | | | | |
| | A-2-f | | | | | | | | | | 0.8 | | | |
| | A-2-g | | | | | | | | | | | 0.8 | | |
| | | | | | | | | | | 0.6 | | | 0.8 | 0.8 |
| | | | | | | | | | 8.0 | | | | 1.5 | 1.5 |
| | Ultraviolet radiation absorber Tinuvin 384-2 | 1.5 | 1.5 | 1.5 | 1.5 | 1.5 | 1.5 | 1.5 | 1.5 | 1.5 | 1.5 | 1.5 | | |
| | Phostabilizer Tinuvin 292 | 1.0 | 1.0 | 1.0 | 1.0 | 1.0 | 1.0 | 1.0 | 1.0 | 1.0 | 1.0 | 1.0 | 1.0 | 1.0 |
| | 10% solution of silicone-based surface conditioner (A-4) | 0.2 | 0.2 | 0.2 | 0.2 | 0.2 | 0.2 | 0.2 | 0.2 | 0.2 | 0.2 | 0.2 | 0.2 | 0.2 |
| | Solvent BYK-300 10% solution of Solvesso 100 | 13.4 | 13.8 | 12.6 | 13.4 | 13.4 | 14.2 | 10.2 | 6.2 | 18.1 | 13.4 | 13.4 | 13.4 | 13.4 |
| Curing agent | Isocyanate compound Sumidur N3300 | 16.5 | 16.5 | 16.5 | 16.5 | 16.5 | 16.5 | 16.5 | 16.5 | 25.3 | 16.5 | 16.5 | 16.5 | 16.5 |
| Coating material composition ratio | Total | 100.0 | 100.0 | 100.0 | 100.0 | 100.0 | 100.0 | 100.0 | 100.0 | 100.0 | 100.0 | 100.0 | 100.0 | 100.0 |
| | Mass of solid content in hydroxy group-containing acrylic resin (A-1) | 40.0 | 40.0 | 40.0 | 40.0 | 40.0 | 40.0 | 40.0 | 40.0 | 40.0 | 40.0 | 40.0 | 40.0 | 40.0 |
| | NCO/OH molar ratio | 1.0 | 1.0 | 1.0 | 1.0 | 1.0 | 1.0 | 1.0 | 1.0 | 1.0 | 1.0 | 1.0 | 1.0 | 1.0 |
| | Mass % of surface conditioner (A-2) relative to hydroxy group-containing acrylic resin (A-1) | 1.0 | 0.5 | 2.0 | 1.0 | 1.0 | 0.0 | 5.0 | 10.0 | 1.0 | 1.0 | 1.0 | 1.0 | 1.0 |
| Evaluation results | Coating film appearance | ◎ | ◎ | ◎ | ◎ | ◎ | ◎ | △ | × | △ | ◎ | ◎ | ◎ | △ |
| | Water resistance | ○ | ○ | ○ | ○ | ○ | ○ | ○ | × | △ | ○ | ○ | ○ | ○ |
| | Gasoline resistance | ○ | ○ | ◎ | ○ | ○ | ○ | ○ | × | △ | ○ | ○ | ○ | ○ |
| | Adhesion to double-sided tape | ◎ | ○ | ◎ | ○ | ○ | × | △ | × | × | △ | △ | △ | △ |

TABLE 5

| | | Working Example 1 | Working Example 2 | Working Example 3 | Working Example 4 | Working Example 5 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|---|
| | | CC-1 | CC-2 | CC-3 | CC-4 | CC-5 | CC-6 | CC-7 | CC-8 | CC-9 | CC-10 | CC-11 | CC-12 | CC-13 |
| Main agent | Clear coating material | 66.7 | 66.7 | 66.7 | 66.7 | 66.7 | 66.7 | 66.7 | 66.7 | 53.3 | 66.7 | 66.7 | 66.7 | 66.7 |
| | Hydroxy group-containing acrylic resin (A-1) A-1-1 | | | | | | | | | | | | | |
| | A-1-2 | | | | | | | | | | | | | |
| | 50% xylene solution of surface conditioner (A-2-a) | 0.8 | 0.4 | 1.6 | | | | | | | | | | |
| | A-2-b | | | | | | | 4.0 | 8.0 | 0.6 | | | | |
| | A-2-c | | | | | | | | | | 0.8 | | | |
| | A-2-d | | | | 0.8 | | | | | | | | | |
| | A-2-e | | | | | 0.8 | | | | | | | | |
| | A-2-f | | | | | | | | | | | 0.8 | | |
| | A-2-g | | | | | | | | | | | | 0.8 | 0.8 |
| | Ultraviolet radiation absorber Tinuvin 384-2 | 1.5 | 1.5 | 1.5 | 1.5 | 1.5 | 1.5 | 1.5 | 1.5 | 1.5 | 1.5 | 1.5 | 1.5 | 1.5 |
| | Photostabilizer Tinuvin 292 | 1.0 | 1.0 | 1.0 | 1.0 | 1.0 | 1.0 | 1.0 | 1.0 | 1.0 | 1.0 | 1.0 | 1.0 | 1.0 |
| | 10% solution of silicone-based surface conditioner BYK-300 | 0.2 | 0.2 | 0.2 | 0.2 | 0.2 | 0.2 | 0.2 | 0.2 | 0.2 | 0.2 | 0.2 | 0.2 | 0.2 |
| | Solvent Solvesso 100 | 13.4 | 13.8 | 12.6 | 13.4 | 13.4 | 14.2 | 10.2 | 6.2 | 18.1 | 13.4 | 13.4 | 13.4 | 13.4 |
| Curing agent | Isocyanate Compound Sumidur N3300 | 16.5 | 16.5 | 16.5 | 16.5 | 16.5 | 16.5 | 16.5 | 16.5 | 25.3 | 16.5 | 16.5 | 16.5 | 16.5 |
| Coating material composition ratio | Total | 100.0 | 100.0 | 100.0 | 100.0 | 100.0 | 100.0 | 100.0 | 100.0 | 100.0 | 100.0 | 100.0 | 100.0 | 100.0 |
| | Mass of solid content in hydroxy group-containing acrylic resin (A-1) | 40.0 | 40.0 | 40.0 | 40.0 | 40.0 | 40.0 | 40.0 | 40.0 | 32.0 | 40.0 | 40.0 | 40.0 | 40.0 |
| | NCO/OH molar ratio | 1.0 | 1.0 | 1.0 | 1.0 | 1.0 | 1.0 | 1.0 | 1.0 | 1.0 | 1.0 | 1.0 | 1.0 | 1.0 |
| | Mass % of surface conditioner (A-2) relative to hydroxy group-containing acrylic resin (A-1) | 1.0 | 0.5 | 2.0 | 1.0 | 1.0 | 0.0 | 5.0 | 10.0 | 1.0 | 1.0 | 1.0 | 1.0 | 1.0 |
| Evaluation results | Coating film appearance | ◎ | ◎ | ◎ | ◎ | ◎ | ◎ | △ | X | △ | ◎ | ◎ | ◎ | △ |
| | Water resistance | ○ | ○ | ○ | ○ | ○ | ○ | ○ | X | △ | ○ | ○ | ○ | ○ |
| | Gasoline resistance | ○ | ○ | ○ | ○ | ○ | ○ | △ | X | △ | ○ | △ | △ | ○ |
| | Adhesion double-sided tape | ◎ | ○ | ◎ | ○ | ○ | X | △ | X | X | △ | △ | △ | △ |

As is clear from the working examples and comparative examples, the working examples of the present invention achieved good results in all the evaluation items, whereas the comparative examples could not achieve good results in all the evaluation items.

The invention achieved by the inventors of the present invention has been explicitly described above by means of embodiments, but the present invention is not limited to these embodiments, and it goes without saying that a variety of alterations are possible as long as these do not deviate from the gist of the invention.

The invention claimed is:

1. A method for forming a multilayer coating film by sequentially coating an intermediate coating material composition, a base coating material composition and a clear coating material composition on a metal for a motor vehicle body, on which an electrodeposition coating material has been coated and a formed electrodeposition coating film has been completely baked, and then thermally curing, wherein the clear coating material composition is obtained by mixing a main agent (A) and a curing agent (B), the main agent (A) contains a hydroxy group-containing acrylic resin (A-1) as a main resin and a surface conditioner (A-2) at a quantity of 0.01-3.0 mass % relative to the mass of solid content in the hydroxy group-containing acrylic resin (A-1), the hydroxy group-containing acrylic resin (A-1) has a hydroxy value of 80-250 mg KOH/g, a mass average molecular weight of 1,000-30,000 and a solubility parameter (SP) value of 9.0-12.0, the surface conditioner (A-2) is a polymer which has a mass average molecular weight of 3,000-100,000 and is obtained by grafting an acrylic resin (A-2-i) and a resin (A-2-ii), the solubility parameter (SP) value of the acrylic resin (A-2-i) is 8.5-10.0, and the solubility parameter (SP) value of the resin (A-2-ii) is at least 2.0 higher than the solubility parameter (SP) value of the acrylic resin (A-2-i).

2. The method for forming a multilayer coating film according to claim 1, wherein the hydroxy group-containing acrylic resin (A-1) comprises a copolymer of a hydroxy group-containing mono (meth) acrylate and other vinyl-based monomers.

3. The method for forming a multilayer coating film according to claim 1, wherein the acrylic resin (A-2-i) comprises a copolymer a plurality of types of vinyl-based monomers.

4. The method for forming a multilayer coating film according to claim 1, wherein the resin (A-2-ii) comprises one or more of an acrylic resin, a polyurethane resin and a monovalent polyalkylene oxide containing an ethylene oxide unit.

5. The method for forming a multilayer coating film according to claim 1, wherein the surface conditioner (A-2) is a graft polymer in which the acrylic resin (A-2-i)/resin (A-2-ii) mass ratio is 90/10-50/50.

6. The method for forming a multilayer coating film according to claim 1, wherein the intermediate coating material composition is an aqueous two-component type intermediate coating material composition which contains an acrylic urethane resin having a hydroxy value of 20-40 mg KOH/g and an acid value of 20-40 mg KOH/g at a quantity of 20-60 mass % of solid resin content in the main agent and contains a carbodiimide compound having 2 moles or more of carbodiimide groups per molecule as a curing agent, and in which the ratio of the equivalent amount of carbodiimide groups relative to the equivalent amount of carboxylic acid groups contained in the main agent resin is 0.8-1.2.

7. The method for forming a multilayer coating film according to claim 1, wherein the base coating material composition is an aqueous base coating material composition that contains an acrylic urethane resin having a hydroxy value of 20-40 mg KOH/g and an acid value of 20-40 mg KOH/g at a quantity of 20-60 mass % of the solid resin content.

8. The method for forming a multilayer coating film according to claim 1, wherein the baking temperature during thermal curing is 75-100° C.

9. A method for forming a multilayer coating film by sequentially coating an intermediate coating material composition, a base coating material composition and a clear coating material composition on a resin material for a motor vehicle exterior, and then thermally curing, wherein the clear coating material composition is obtained by mixing a main agent (A) and a curing agent (B), the main agent (A) contains a hydroxy group-containing acrylic resin (A-1) as a main resin and a surface conditioner (A-2) at a quantity of 0.01-3.0 mass % relative to the mass of solid content in the hydroxy group-containing acrylic resin (A-1), the hydroxy group-containing acrylic resin (A-1) has a hydroxy value of 80-250 mg KOH/g, a mass average molecular weight of 1,000-30,000 and a solubility parameter (SP) value of 9.0-12.0, the surface conditioner (A-2) is a polymer which has a mass average molecular weight of 3,000-100,000 and is obtained by grafting an acrylic resin (A-2-i) and a resin (A-2-ii), the solubility parameter (SP) value of the acrylic resin (A-2-i) is 8.5-10.0, and the solubility parameter (SP) value of the resin (A-2-ii) is at least 2.0 higher than the solubility parameter (SP) value of the acrylic resin (A-2-i).

10. The method for forming a multilayer coating film according to claim 9, wherein the hydroxy group-containing acrylic resin (A-1) comprises a copolymer of a hydroxy group-containing mono (meth) acrylate and other vinyl-based monomers.

11. The method for forming a multilayer coating film according to claim 9, wherein the acrylic resin (A-2-i) comprises a copolymer a plurality of types of vinyl-based monomers.

12. The method for forming a multilayer coating film according to claim 9, wherein the resin (A-2-ii) comprises one or more of an acrylic resin, a polyurethane resin and a monovalent polyalkylene oxide containing an ethylene oxide unit.

13. The method for forming a multilayer coating film according to claim 9, wherein the surface conditioner (A-2) is a graft polymer in which the acrylic resin (A-2-i)/resin (A-2-ii) mass ratio is 90/10-50/50.

14. The method for forming a multilayer coating film according to claim 9, wherein the intermediate coating material composition is an aqueous two-component type intermediate coating material composition which contains an acrylic urethane resin having a hydroxy value of 20-40 mg KOH/g and an acid value of 20-40 mg KOH/g at a quantity of 20-60 mass % of solid resin content in the main agent and contains a carbodiimide compound having 2 moles or more of carbodiimide groups per molecule as a curing agent, and in which the ratio of the equivalent amount of carbodiimide groups relative to the equivalent amount of carboxylic acid groups contained in the main agent resin is 0.8-1.2.

15. The method for forming a multilayer coating film according to claim 9, wherein the base coating material composition is an aqueous base coating material composition that contains an acrylic urethane resin having a hydroxy value of 20-40 mg KOH/g and an acid value of 20-40 mg KOH/g at a quantity of 20-60 mass % of the solid resin content.

16. The method for forming a multilayer coating film according to claim 9, wherein the baking temperature during thermal curing is 75-100° C.

* * * * *